United States Patent
Tsai et al.

(10) Patent No.: US 9,631,802 B2
(45) Date of Patent: Apr. 25, 2017

(54) DIRECT-TYPE LED BACKLIGHT MODULE

(71) Applicant: Top Victory Investments Ltd., Kowloon (HK)

(72) Inventors: Charles Tsai, New Taipei (TW); Jush Lu, New Taipei (TW); Brian Lin, New Taipei (TW); Max Huang, New Taipei (TW); Jessie Chueh, New Taipei (TW); Roger Su, New Taipei (TW)

(73) Assignee: Top Victory Investments Ltd., Kowloon (HK)

( * ) Notice: Subject to any disclaimer, the term of this patent is extended or adjusted under 35 U.S.C. 154(b) by 69 days.

(21) Appl. No.: 14/829,712

(22) Filed: Aug. 19, 2015

(65) Prior Publication Data

US 2017/0051904 A1 Feb. 23, 2017

(51) Int. Cl.
| | |
|---|---|
| *G09F 13/04* | (2006.01) |
| *F21V 23/06* | (2006.01) |
| *F21S 4/28* | (2016.01) |
| *F21V 23/00* | (2015.01) |
| *F21V 19/00* | (2006.01) |
| *G02F 1/1335* | (2006.01) |
| *F21Y 103/00* | (2016.01) |
| *F21Y 105/00* | (2016.01) |

(52) U.S. Cl.
CPC ............. *F21V 23/06* (2013.01); *F21S 4/28* (2016.01); *F21V 19/003* (2013.01); *F21V 23/006* (2013.01); *G02F 1/133603* (2013.01); *G02F 1/133608* (2013.01); *F21Y 2103/003* (2013.01); *F21Y 2105/001* (2013.01); *G02F 2001/133612* (2013.01); *G02F 2001/133626* (2013.01)

(58) Field of Classification Search
CPC ........ F21V 23/06; F21V 19/003; F21V 23/006; F21S 4/28; G02F 1/133603; G02F 1/133608
USPC .......................................... 362/97.3
See application file for complete search history.

(56) References Cited

U.S. PATENT DOCUMENTS

| | | | |
|---|---|---|---|
| 7,572,026 B2* | 8/2009 | Park ................. | G02F 1/133603 362/231 |
| 8,047,669 B2* | 11/2011 | Bourdelais ........... | G02B 6/0078 362/249.02 |

(Continued)

*Primary Examiner* — Bryon T Gyllstrom
(74) *Attorney, Agent, or Firm* — Alan D. Kamrath; Kamrath IP Lawfirm, P.A.

(57) ABSTRACT

A direct-type LED backlight module includes a back bezel having opposite first and second surfaces, a daughterboard having opposite third and fourth surfaces, LED lightbars disposed on the first surface, and a local dimming control board disposed on the second surface. The first surface has a groove disposed thereon. The second surface has a through hole disposed thereon and communicating with the groove. The daughterboard is disposed in the groove. The third surface has first connectors disposed thereon and protruding out the groove. The fourth surface has a second connector disposed thereon and protruding out the second surface through the through hole. The first and second connectors are electrically connected. Each LED lightbar has a third connector disposed thereon and connected to the corresponding first connector. The local dimming control board has a fourth connector disposed thereon and connected to the second connector. It reduces wiring cost and assembly time.

9 Claims, 8 Drawing Sheets

(56) References Cited

U.S. PATENT DOCUMENTS

| | | | |
|---|---|---|---|
| 8,240,865 B2* | 8/2012 | Park | G02F 1/133603 362/97.1 |
| 8,967,822 B2* | 3/2015 | Hong | G02F 1/133603 362/97.1 |
| 2007/0053176 A1* | 3/2007 | Chou | G02F 1/133603 362/97.3 |
| 2009/0207339 A1* | 8/2009 | Ajichi | G02B 5/0242 349/64 |
| 2010/0110330 A1* | 5/2010 | Ajichi | G02F 1/133611 349/62 |
| 2011/0222293 A1* | 9/2011 | Kim | F21S 2/005 362/294 |
| 2012/0113328 A1* | 5/2012 | Takeshima | G02F 1/133603 348/739 |
| 2015/0234234 A1* | 8/2015 | Lee | G02F 1/133609 362/97.3 |

* cited by examiner

DIRECT-TYPE LED BACKLIGHT MODULE

BACKGROUND OF THE INVENTION

1. Field of the Invention

The present invention relates to a direct-type light-emitting diode (LED) backlight module and, more particularly, to a direct-type LED backlight module using a local dimming technology.

2. Description of the Prior Art

A direct-type LED backlight module is disposed behind a display panel, such as a liquid-crystal display panel, which produces no light of its own. The direct-type LED backlight module is configured to provide external light for the display panel to produce a visible image. Moreover, the direct-type LED backlight module may further use a local dimming technology to reduce power consumption and increase the contrast ratio of the image.

The conventional direct-type LED backlight module using the local dimming technology has a basic structure including a back bezel, a reflector, LED lightbars, a diffuser and at least one local dimming control board. The back bezel has a first surface and a second surface opposite each other. Each LED lightbar includes a printed circuit board (PCB) and LEDs disposed on the PCB. The LED lightbars are disposed on the first surface of the back bezel, and the LEDs disposed on the LED lightbars are uniformly arranged relative to the display panel. The diffuser is disposed above the LED lightbars and configured to diffuse light emitted from the LEDs to form a surface light source with a uniform brightness. The reflector is disposed between the back bezel and the LED lightbars and configured to reflect the light emitted from the LEDs toward the diffuser to raise the efficiency of the light emitted from the light source. Each local dimming control board is disposed on the second surface of the back bezel and configured to adjust the brightness of the LEDs within a specific zone to implement local dimming. Therefore, each local dimming control board needs cables to connect with the corresponding LED lightbars. These cables needs to be installed from the back bezel second surface where each local dimming control board is disposed to the back bezel first surface where the LED lightbars are disposed, resulting in high wiring cost and more assembly time.

SUMMARY OF THE INVENTION

The present invention is adapted to providing a direct-type LED backlight module capable of reducing wiring cost and assembly time.

According to an aspect of the present invention, there is provided a direct-type LED backlight module including a back bezel, a daughterboard, LED lightbars and at least one local dimming control board. The back bezel has a first surface and a second surface opposite each other. A groove is disposed on the first surface of the back bezel. At least one through hole is disposed on the second surface of the back bezel and communicates with the groove. The daughterboard is disposed in the groove. The daughterboard has a third surface and a fourth surface opposite each other. First connectors are disposed on the third surface of the daughterboard and protrude out the groove. At least one second connector is disposed on the fourth surface of the daughterboard and protrudes out the second surface of the back bezel through the at least one through hole. The first connectors are electrically connected to the at least one second connector through conductive wires routed on the daughterboard. The LED lightbars are disposed on the first surface of the back bezel. A third connector is disposed on each LED lightbar and connected to the corresponding first connector. The at least one local dimming control board is disposed on the second surface of the back bezel. A fourth connector is disposed on each local dimming control board and connected to the corresponding second connector.

According to another aspect of the present invention, the groove is disposed along a centerline of the first surface of the back bezel. The first connectors are arranged in two rows disposed on two opposite sides of the third surface of the daughterboard, respectively. The third connector is disposed at an end of each LED lightbar.

According to another aspect of the present invention, the groove is disposed along a centerline of the first surface of the back bezel. The first connectors are arranged in a row disposed on the third surface of the daughterboard. The third connector is disposed at a center of each LED lightbar.

According to another aspect of the present invention, the groove is disposed on a side of the first surface of the back bezel. The first connectors are arranged in a row disposed on the third surface of the daughterboard. The third connector is disposed at an end of each LED lightbar.

According to another aspect of the present invention, the direct-type LED backlight module further includes another groove and another daughterboard. The two grooves are disposed on two opposite sides of the first surface of the back bezel, respectively. The two daughterboards are disposed in the two grooves, respectively. The first connectors are arranged in a row disposed on the third surface of each daughterboard. The third connector is disposed at an end of each LED lightbar.

According to another aspect of the present invention, the daughterboard is opaque.

It is remarked that the aforementioned aspects or features can also be combined with each other and are in the scope of the present invention as well.

Because each local dimming control board is electrically connected to the corresponding LED lightbars through the daughterboard rather than by installing cables from the back bezel second surface where each local dimming control board is disposed to the back bezel first surface where the LED lightbars are disposed, it may reduce wiring cost and assembly time.

The foregoing, as well as additional objects, features and advantages of the present invention will be more readily apparent from the following embodiments and detailed description, which proceed with reference to the accompanying drawings.

DESCRIPTION OF THE PREFERRED EMBODIMENTS

Reference will now be made in detail to several embodiments of the present invention that are illustrated in the accompanying drawings. Wherever possible, same or similar reference numerals are used in the drawings and the description to refer to the same or like parts. For purposes of convenience and clarity, the drawings are in simplified form and are not to precise scale or shape. Moreover, directional terms, such as top, bottom, right and left, may be used with respect to the drawings. These and similar directional terms should not be construed to limit the scope of the present invention in any manner.

Figure 1:
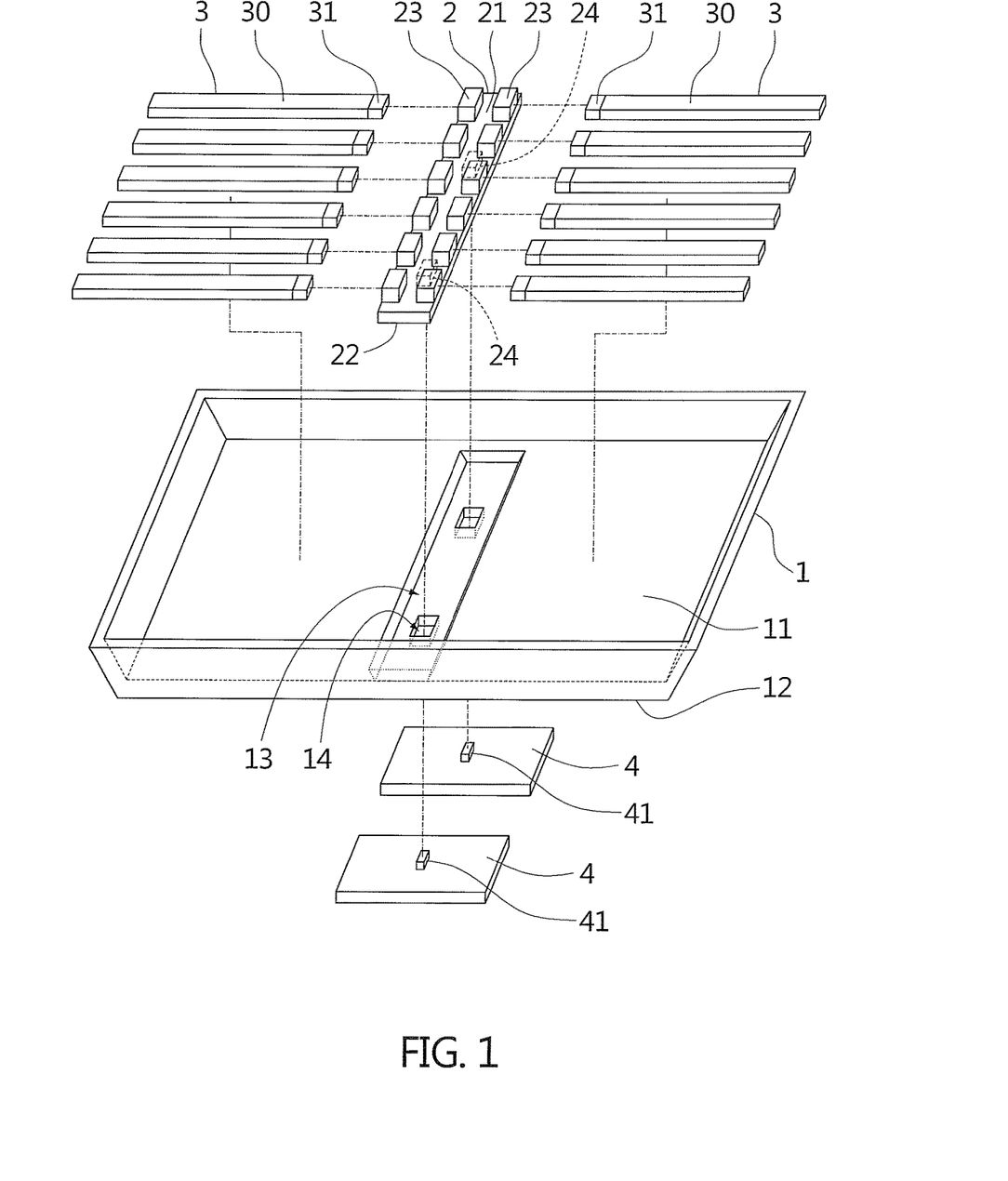
FIG. 1 is an exploded view of a direct-type LED backlight module according to a first embodiment of the present invention.
Figure 2:
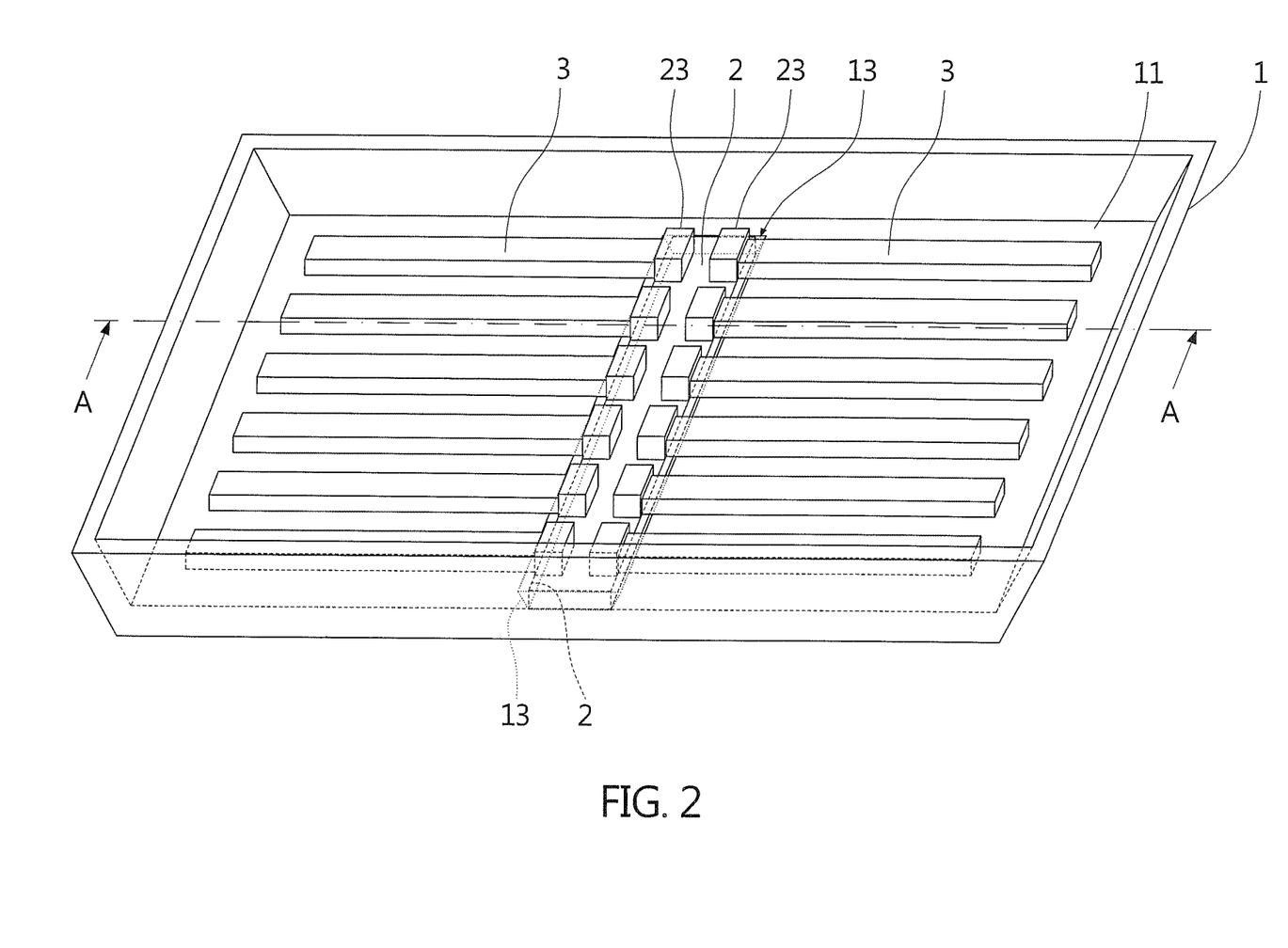
FIG. 2 is an assembled view of the direct-type LED backlight module according to the first embodiment of the present invention.
Figure 3:
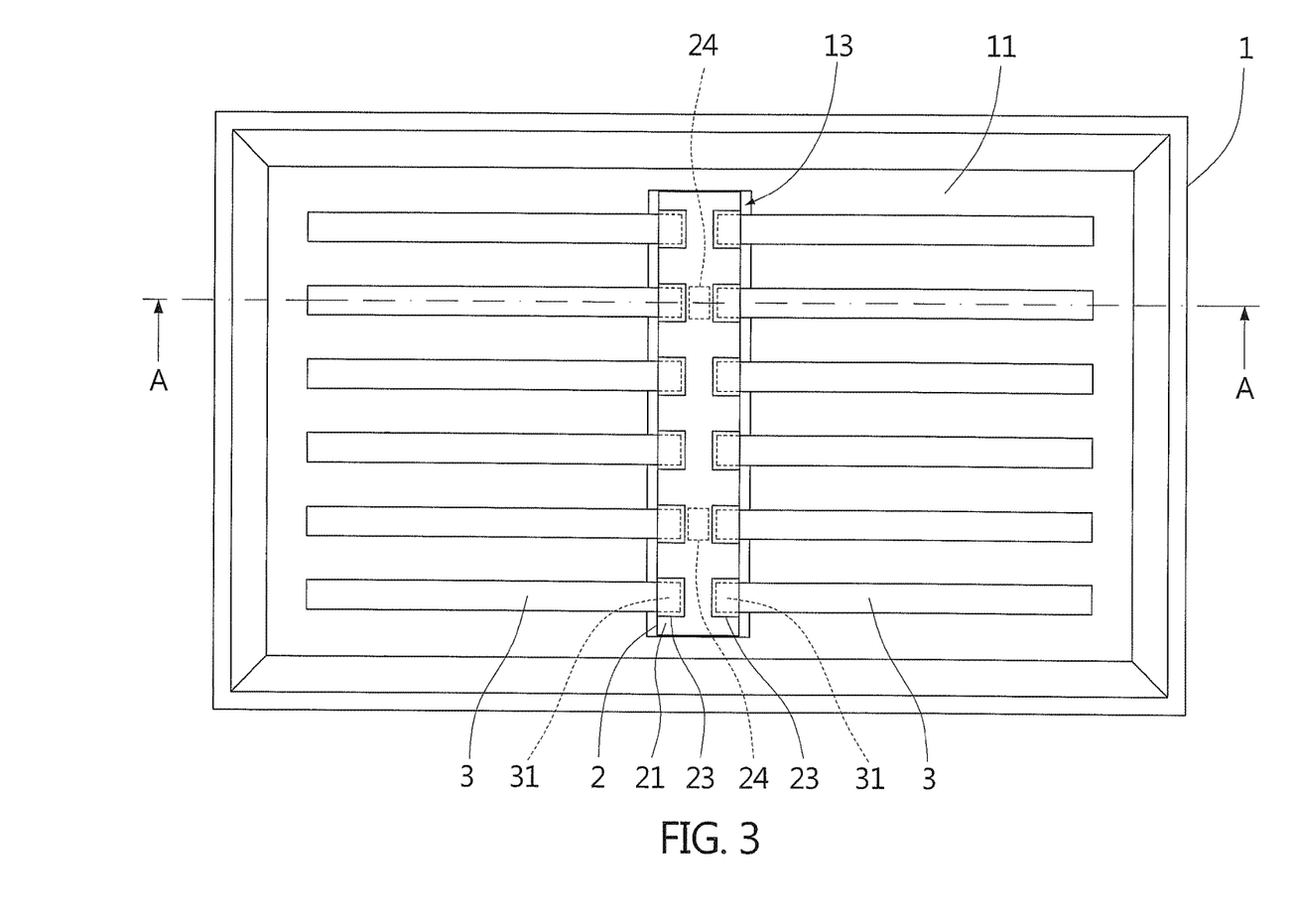
FIG. 3 is a top view of the direct-type LED backlight module according to the first embodiment of the present invention.
Figure 4:
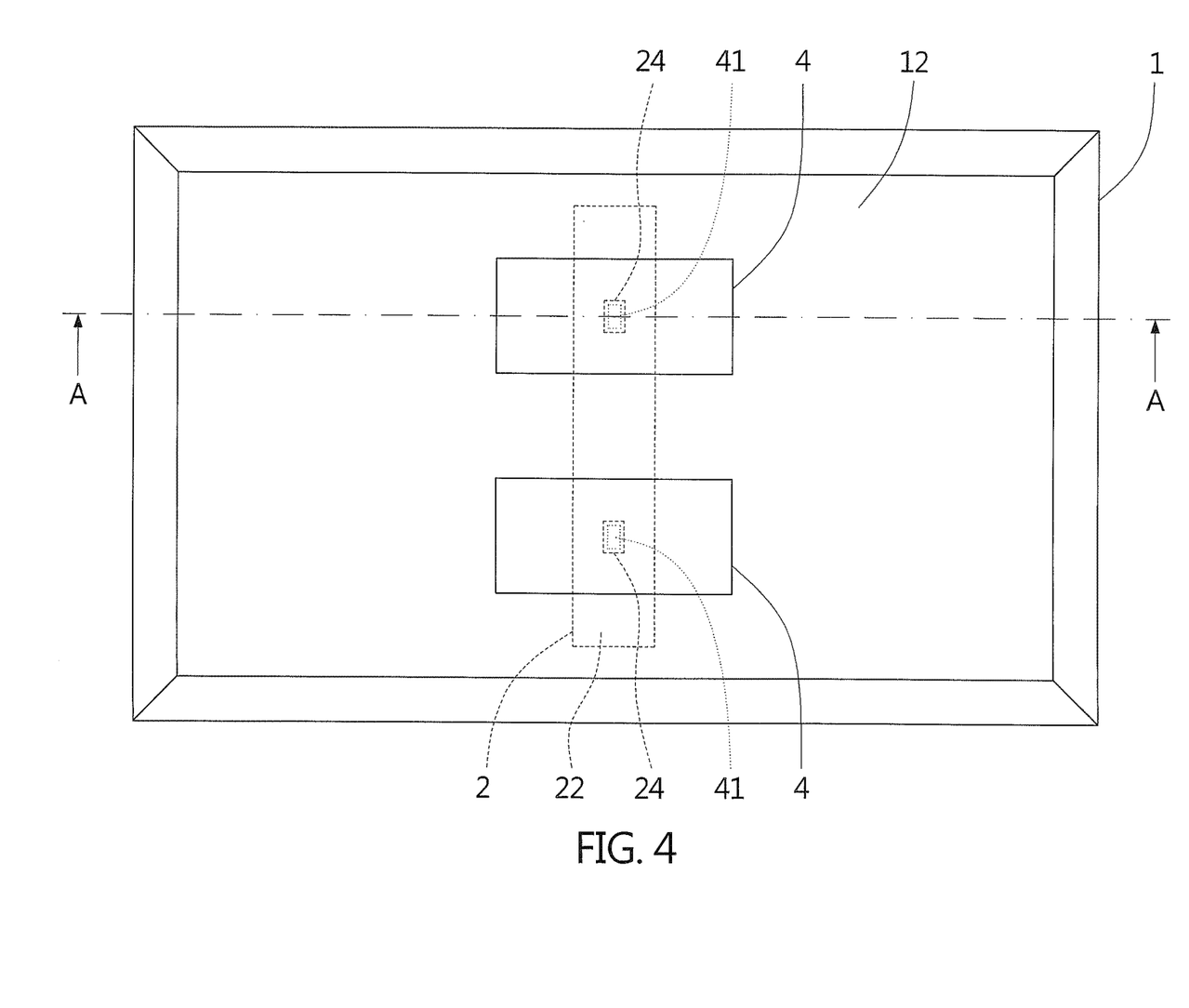
FIG. 4 is a bottom view of the direct-type LED backlight module according to the first embodiment of the present invention.
Figure 5:
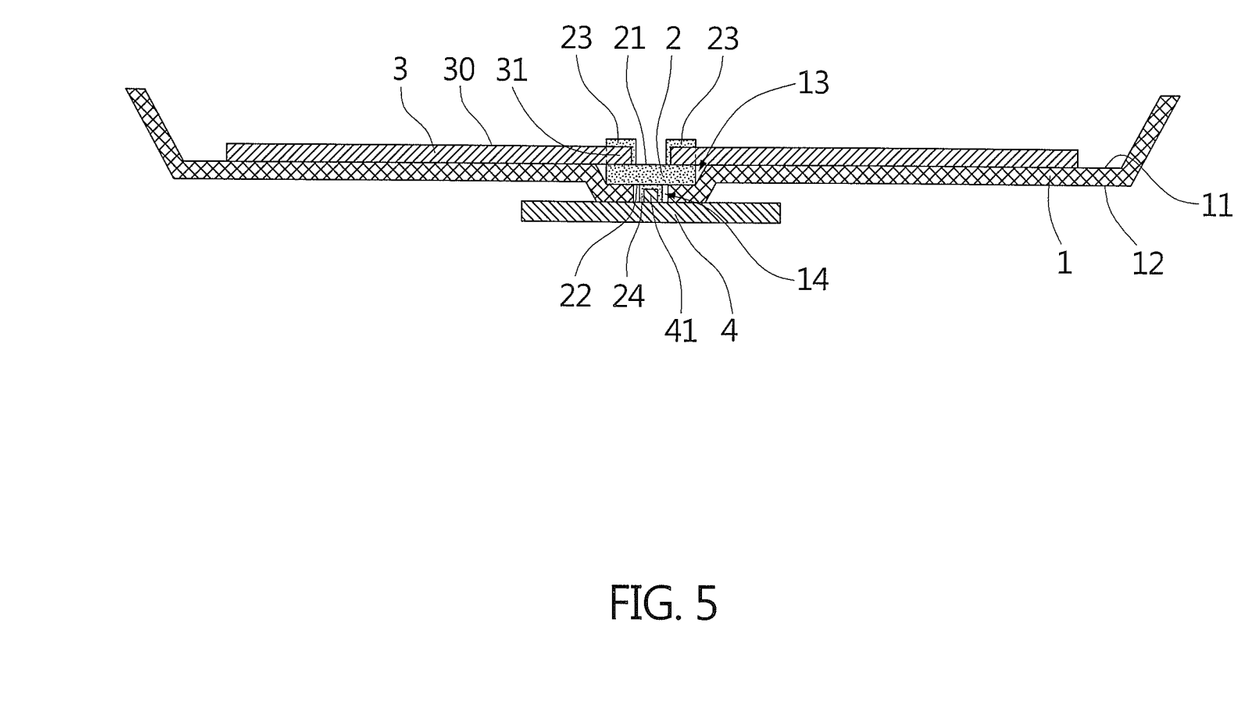
FIG. 5 is a sectional view of the direct-type LED backlight module according to the first embodiment of the present invention.

FIG. 1 through FIG. 4 illustrate exploded, assembled, top and bottom views of a direct-type LED backlight module according to a first embodiment of the present invention, respectively. FIG. 5 illustrates a sectional view taken along a line A-A as shown in FIG. 2 through FIG. 4. Referring to FIG. 1 through FIG. 5, in the first embodiment, the direct-type LED backlight module includes a back bezel 1, a daughterboard 2, LED lightbars 3 and two local dimming control boards 4. The drawings omit some conventional components, such as a reflector and a diffuser. The direct-type LED backlight module is disposed behind a display panel (not shown), such as a liquid-crystal display panel, which produces no light of its own. The direct-type LED backlight module is configured to provide external light for the display panel to produce a visible image.

The back bezel 1 has a first surface 11 and a second surface 12 opposite each other. A groove 13 is disposed on and along a centerline of the first surface 11 of the back bezel 1. Two through holes 14 are disposed on the second surface 12 of the back bezel 1 and communicate with the groove 13.

The daughterboard 2 is disposed in the groove 13. The daughterboard 2 has a third surface 21 and a fourth surface 22 opposite each other. First connectors 23 are arranged in two rows disposed on two opposite sides of the third surface 21 of the daughterboard 2, respectively. Moreover, the first connectors 23 protrude out the groove 13. Two second connectors 24 are disposed on the fourth surface 22 of the daughterboard 2, and each second connector 24 protrudes out the second surface 12 of the back bezel 1 through the corresponding through hole 14. The first connectors 23 are electrically connected to the two second connectors 24 through conductive wires (not shown) routed on the daughterboard 2.

Each LED lightbar 3 includes a PCB 30 and LEDs (not shown) disposed on the PCB 30. The LED lightbars 3 are disposed on the first surface 11 of the back bezel 1, and the LEDs disposed on the LED lightbars 3 are uniformly arranged relative to the display panel. A third connector 31 is disposed at an end of each LED lightbar 3 and connected to the corresponding first connector 23 disposed on the daughterboard 2. Therefore, the daughterboard 2 is electrically connected to the LED lightbars 3 through the connections of the first connectors 23 and the third connectors 31.

The two local dimming control boards 4 are disposed on the second surface 12 of the back bezel 1. A fourth connector 41 is disposed on each local dimming control board 4 and connected to the corresponding second connector 24 disposed on the daughterboard 2. Therefore, each local dimming control board 4 is electrically connected to the daughterboard 2 through the connections of the fourth connector 41 and the second connector 24. Moreover, because the daughterboard 2 is electrically connected to the LED lightbars 3 through the connections of the first connectors 23 and the third connectors 31, and each second connector 24 is electrically connected to a portion of the first connectors 23 through conductive wires routed on the daughterboard 2, each local dimming control board 4 is electrically connected to a portion of the LED lightbars 3 through the daughterboard 2 to adjust the brightness of the LEDs of the portion of the LED lightbars 3 within a specific zone to implement the local dimming.

Obviously, in the embodiment, each local dimming control board 4 is electrically connected to a portion of the LED lightbars 3 through the daughterboard 2 rather than by installing cables from the back bezel second surface 12 where each local dimming control board 4 is disposed to the back bezel first surface 11 where the LED lightbars 3 are disposed. Therefore, it may reduce wiring cost and assembly time.

Moreover, in the embodiment, the daughterboard 2 may be is opaque to prevent the light emitted from the LEDs from going into the through holes 14 through the daughterboard 2 rather than being reflected to the display panel. Therefore, the opaque daughterboard 2 may raise the efficiency of the light emitted from the light source.

The aforementioned embodiment is not intended to limit the scope of the present invention. For example, as the number of the zones to be controlled to implement the local dimming varies, the number of the local dimming control boards may be reduced to one or increased to more than two. Accordingly, the number of the through holes of the back bezel and the number of the second connectors of the daughterboard need to be reduced or increases according to the number of the local dimming control boards.

Figure 6:
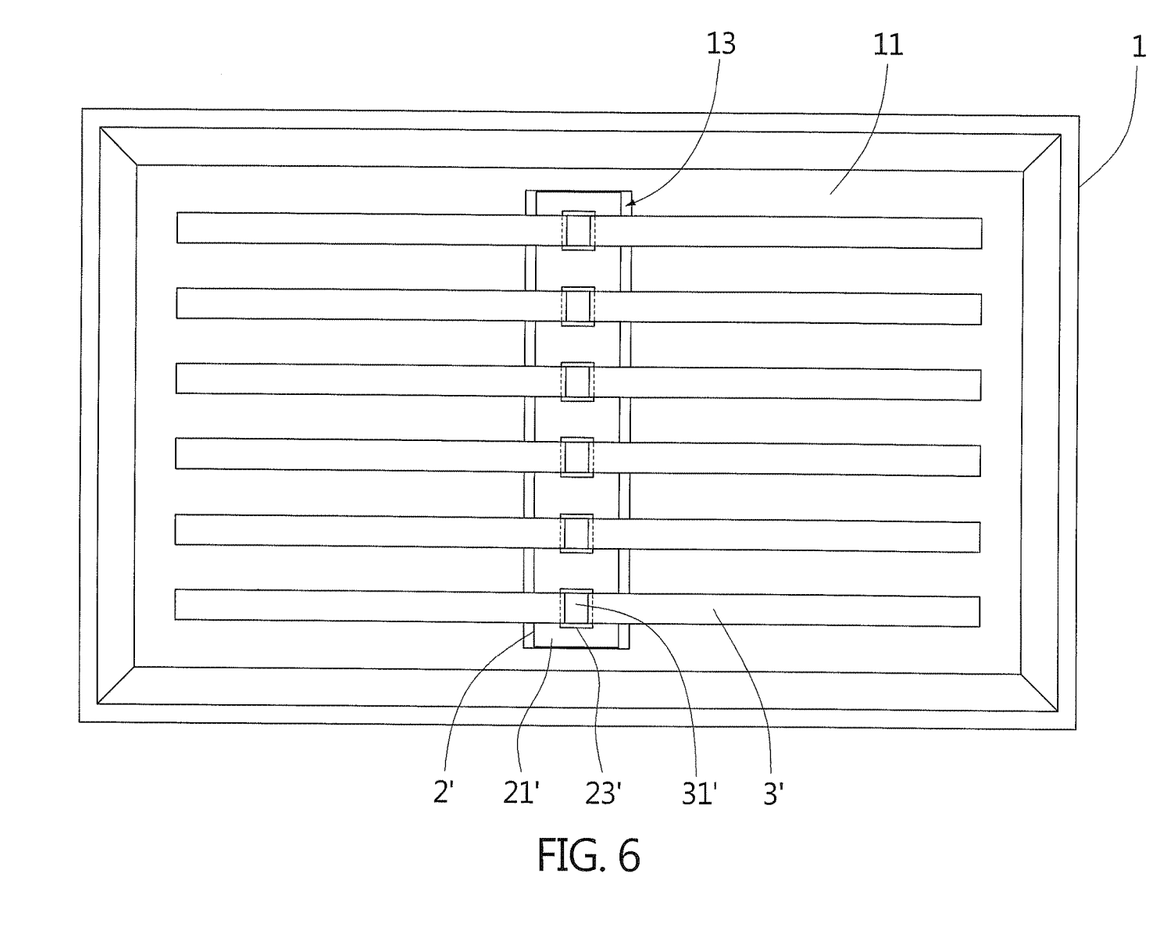
FIG. 6 is a top view of a direct-type LED backlight module according to a second embodiment of the present invention.

FIG. 6 is a top view of a direct-type LED backlight module according to a second embodiment of the present invention. Referring to FIG. 6, in the second embodiment, the groove 13 is disposed along a centerline of the first surface 11 of the back bezel 1. The first connectors 23' are arranged in a row disposed on the third surface 21' of the daughterboard 2'. The third connector 31' is disposed at a center of each LED lightbar 3'.

Figure 7:
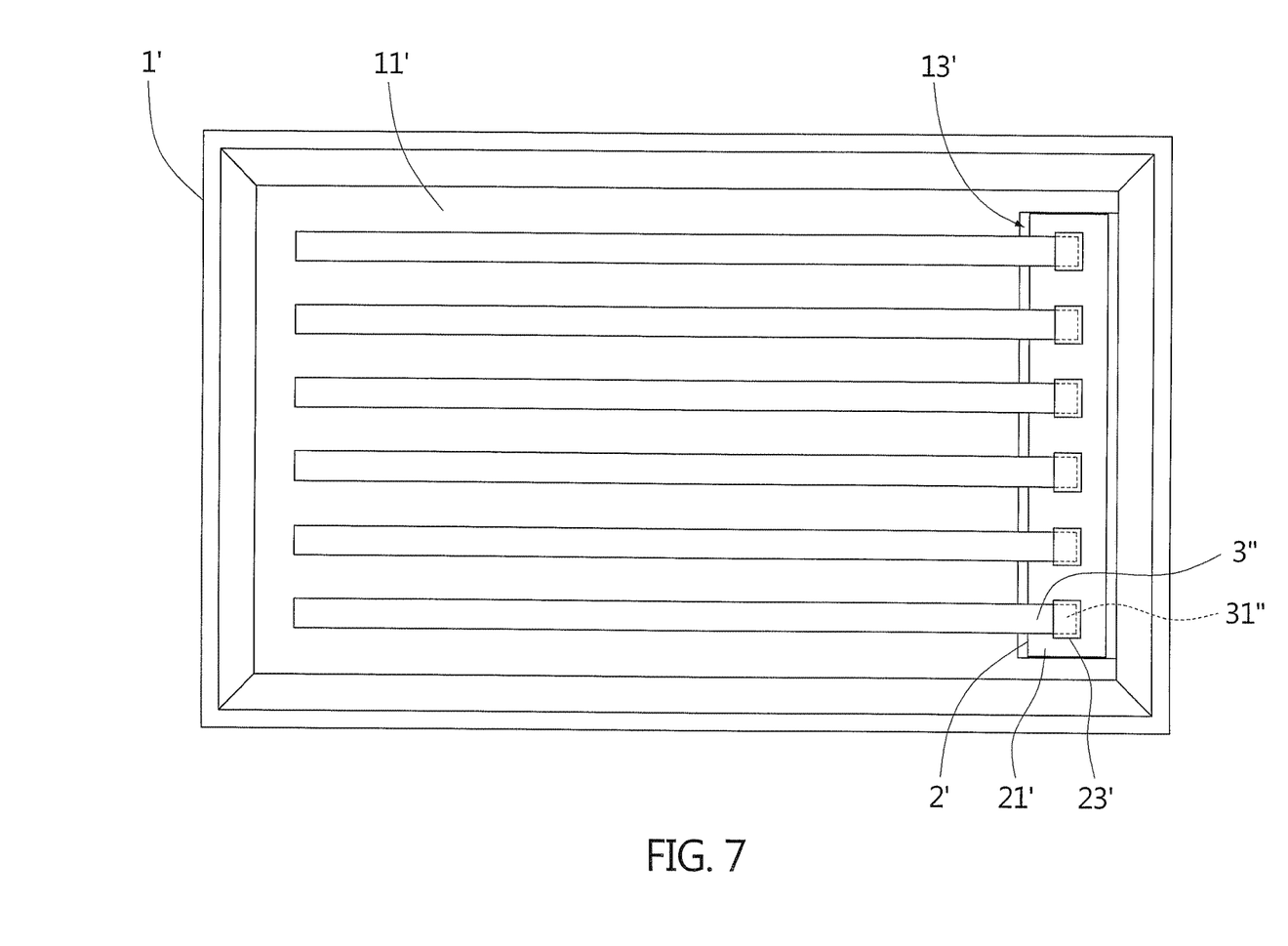
FIG. 7 is a top view of a direct-type LED backlight module according to a third embodiment of the present invention.

FIG. 7 is a top view of a direct-type LED backlight module according to a third embodiment of the present invention. Referring to FIG. 7, in the third embodiment, the groove 13' is disposed on a right side of the first surface 11' of the back bezel 1'. The first connectors 23' are arranged in a row disposed on the third surface 21' of the daughterboard 2'. The third connector 31" is disposed at an end of each LED lightbar 3".

Figure 8:
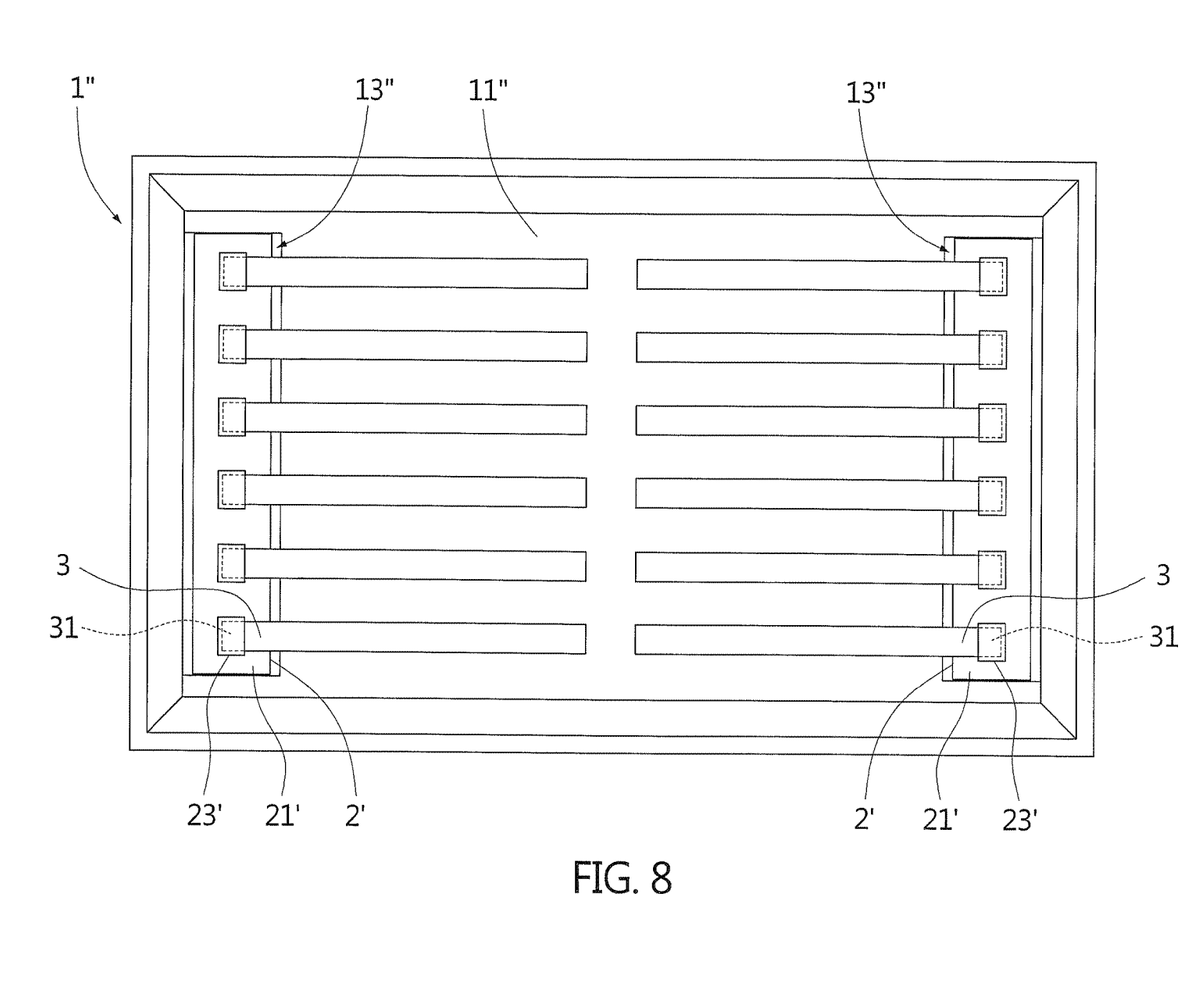
FIG. 8 is a top view of a direct-type LED backlight module according to a fourth embodiment of the present invention.

FIG. 8 is a top view of a direct-type LED backlight module according to a fourth embodiment of the present invention. Referring to FIG. 8, in the fourth embodiment, the direct-type LED backlight module includes two groove 13" and two daughterboard 2'. The two grooves 13" are disposed on two opposite sides (i.e. right and left sides) of the first surface 11" of the back bezel 1", respectively. The two daughterboards 2' are disposed in the two grooves 13", respectively. The first connectors 23' are arranged in a row disposed on the third surface 21' of each daughterboard 2'. The third connector 31 is disposed at an end of each LED lightbar 3.

In summary, in the present invention, because each local dimming control board is electrically connected to the corresponding LED lightbars through the daughterboard rather than by installing cables from the back bezel second surface where the local dimming control board is disposed to the back bezel first surface where the LED lightbars are disposed, it may reduce wiring cost and assembly time.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A direct-type LED backlight module comprising:
    a back bezel having a first surface and a second surface opposite each other, with a groove disposed on the first surface, with at least one through hole disposed on the second surface and communicating with the groove;
    a daughterboard disposed in the groove, with the daughterboard having a third surface and a fourth surface opposite each other, with a plurality of first connectors disposed on the third surface and protruding out the groove, with at least one second connector disposed on the fourth surface and protruding out the second surface through the at least one through hole, with the plurality of first connectors electrically connected to the at least one second connector through conductive wires routed on the daughterboard;
    a plurality of LED lightbars disposed on the first surface, with a third connector disposed on each of the plurality of LED lightbars and connected to the corresponding first connector; and
    at least one local dimming control board disposed on the second surface, with a fourth connector disposed on each of the at least one local dimming control board and connected to the corresponding second connector.

2. The direct-type LED backlight module of claim 1, wherein the groove is disposed along a centerline of the first surface.

3. The direct-type LED backlight module of claim 2, wherein the plurality of first connectors is arranged in two rows disposed on two opposite sides of the third surface, respectively, wherein the third connector is disposed at an end of each of the plurality of LED lightbars.

4. The direct-type LED backlight module of claim 2, wherein the plurality of first connectors is arranged in a row disposed on the third surface, wherein the third connector is disposed at a center of each of the plurality of LED lightbars.

5. The direct-type LED backlight module of claim 1, wherein the groove is disposed on a side of the first surface.

6. The direct-type LED backlight module of claim 5, wherein the plurality of first connectors is arranged in a row disposed on the third surface, wherein the third connector is disposed at an end of each of the plurality of LED lightbars.

7. The direct-type LED backlight module of claim 1, further comprising another groove and another daughterboard, with the two grooves disposed on two opposite sides of the first surface, respectively, with the two daughterboards disposed in the two grooves, respectively.

8. The direct-type LED backlight module of claim 7, wherein the plurality of first connectors is arranged in a row disposed on the third surface of each of the two daughterboards, wherein the third connector is disposed at an end of each of the plurality of LED lightbars.

9. The direct-type LED backlight module of claim 1, wherein the daughterboard is opaque.

* * * * *